US005781713A

United States Patent [19]

Yamada

[11] Patent Number: 5,781,713
[45] Date of Patent: *Jul. 14, 1998

[54] IMAGE DATA PROCESSING METHOD AND IMAGE PROCESSING DEVICE

[75] Inventor: Hirokazu Yamada, Kobe, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 600,220

[22] Filed: Feb. 12, 1996

[30] Foreign Application Priority Data

Feb. 14, 1995 [JP] Japan .................... 7-025152

[51] Int. Cl.$^6$ .................... G06K 15/00
[52] U.S. Cl. .................... 395/117; 395/101
[58] Field of Search .................... 395/101, 112, 395/113, 114, 117, 135, 802, 778, 782, 523–525; 358/467, 456; 38/176, 175, 173, 180, 195, 198

[56] References Cited

U.S. PATENT DOCUMENTS

| 4,496,989 | 1/1985 | Hirosawa . | |
|---|---|---|---|
| 5,506,944 | 4/1996 | Gentile | 395/114 |
| 5,521,990 | 5/1996 | Ishizawa et al. | 382/270 |

*Primary Examiner*—Arthur G. Evans
*Attorney, Agent, or Firm*—Burns, Doane, Swecker & Mathis, LLP

[57] ABSTRACT

A method of image data processing for an image including halftone areas and single-contrast areas includes the steps of expressing a virtual unit of the image by a respective unit of data, each data unit selected from a plurality of data values, wherein each virtual image unit relating to a halftone area is expressed by a value within a first range of the plurality of data values and each virtual image unit relating to a single-contrast area is expressed by a value within a second range of the plurality of data values; separating the data units into halftone data units and single-contrast data units; processing the halftone data units with a halftone processing unit; and processing the single-contrast data units with a single-contrast processing unit. An image data processing apparatus includes an analyzing unit that analyzes image data received from an outside source; a memory that stores the image data analyzed by the analyzing unit; a determination unit that determines whether the image data read out of the memory is a first type image data or a second type image data; a first processing unit that processes the image data determined to be the first type image data as two or more items of high resolution single-contrast image data; a halftone processing unit that performs gradation reproduction of the image data determined to the second type of image data; and a synthesizing unit that synthesizes the image data processed from the first processing unit and from the halftone processing unit.

41 Claims, 9 Drawing Sheets

IMAGE DATA PROCESSING METHOD AND IMAGE PROCESSING DEVICE

BACKGROUND OF THE INVENTION

1. Field of the Invention

The present invention pertains to an image data processing method for virtual imaging of images and an image processing device for printing or displaying images that have been virtually imaged.

2. Description of the Related Art

Conventionally, in image forming apparatus such as page printers, digital copying machines or facsimile machines, images to be printed are virtually imaged in an image memory called a bitmap memory. In other words, before an image is made visible on paper by printing, it is expressed as a collection of per-pixel density data (data comprising a prescribed number of bits). The density data is then read from the image memory in the order of the arrangement of the pixels, and the image for one page is printed on paper. This virtual imaging is also performed for displaying images by various types of display devices.

To increase image quality, a high resolution of at least 600 dpi is required in a page printer for single-contrast images such as characters and lines, while a high-gradation reproduction having at least 64 levels of gradation is necessary for halftone images such as photographs.

In order to improve the resolution, it is necessary to increase the number of pixels on a page. In order to improve the gradation quality, it is necessary to increase the number of bits of per-pixel density data.

Therefore, when it is sought to improve the image quality of compound images comprising a mixture of single-contrast images and halftone images, the bitmap memory capacity has to become extremely large, which is problematic from a cost standpoint as well as from the standpoint of the capabilities of the memory control system.

OBJECTS AND SUMMARY

An object of the present invention is to resolve the problems described above.

Another object of the present invention is to prevent an increase in the amount of data in the image memory.

Yet another object of the present invention is to easily process images comprising a mixture of two different types of images having different resolutions.

Yet another object of the present invention is to easily make visible images comprising a mixture of high-resolution single-contrast images and multi-level gradation halftone images.

Yet another object of the present invention is to improve the image quality of compound images comprising a mixture of single-contrast images and halftone images while preventing an increase in the amount of data in the image memory.

These and other objects are attained by means of an image data processing method to express in the image memory, images comprising a mixture of halftone images and higher resolution single-contrast images. Each unit of data has three or more bits, and pertains to a virtual image unit. Single-contrast images are expressed by m (two or more) data values that are within the value range for said virtual image unit data and which are made to correspond to m different image patterns each comprising two or more single-contrast pixels. Halftone images are expressed by other data values that are within a remaining portion of the value range and which are made to correspond to the densities of the halftone images of said images.

These and other objects are also attained by means of an image processing device to make visible the images expressed as collections of items of data, each having three or more bits, pertaining to virtual image units, wherein said image processing device comprises a single-contrast processing unit that causes said virtual image unit data having specific data values to correspond to image patterns each of which comprise two or more single-contrast pixels, a halftone processing unit that performs gradation reproduction for said virtual image unit data having data values other than the data values indicated above for the single-contrast processing, and a data synthesizing unit that synthesizes image data output from said single-contrast processing unit and said halftone processing unit.

Further, these and other objects are also attained by an image data control method that controls images comprising a mixture of halftone images and higher resolution single-contrast images by means of an image memory having a memory capacity suited to a prescribed number of pixels and a prescribed number of data values, wherein some of the data values are made to correspond to pixel patterns made of two or more single-contrast pixels and the remainder of the data values are made to correspond to halftone image densities.

Further, these and other objects are also attained by an image data processing method in which halftone images and single-contrast images having a resolution different from the halftone images are stored in a bitmap memory having image units each comprising a prescribed number of bits, wherein some of the information that can be expressed by said prescribed number of bits is allocated for the expression of single-contrast image data and the remainder is allocated for the expression of halftone image data.

Further, these and other objects are also attained by an image data processing device that comprises an analyzing unit that analyses image data received from the outside, a memory that stores the image data in accordance with the results of said analysis, a determination unit that determines whether the image data read out of the memory is single-contrast image data or halftone image data, a single-contrast processing unit that processes the image data determined to be single-contrast image data as two or more items of high resolution single-contrast image data, a halftone processing unit that performs gradation reproduction of the image data determined to be halftone image data, and a synthesizing unit that synthesizes the image data output from the single-contrast processing unit and from the halftone processing unit.

Further, these and other objects are also attained by an image data processing device that processes image data pertaining to images comprising a mixture of single-contrast images and halftone images, wherein said image data processing device comprises an image memory in which a prescribed capacity of three bits or larger is allocated to a virtual image unit, a first saving means that allocates two or more types of single-contrast image data each comprising two or more pixels as data for a prescribed information area and saves it in the image memory, and a second saving means that converts halftone image data into data for an information area not used by said first saving means and then saves it in the image memory.

Virtual image unit data is saved in the image memory as density information for the equivalent of one pixel for a halftone image of the entire image (this is called an "image unit" here). However, the possible data values for the virtual image unit data are either one of two types, and density information having different meanings is saved depending on the data value involved. Where the image unit is for a halftone image, the quantified density of each pixel is indicated, and where it is for a single-contrast image, m combinations of single-contrast pixels are indicated. In other words, where halftone images are concerned, virtual image unit data indicates the density of one pixel, which can be one of many tones, and where single-contrast images are concerned, one item of virtual image unit data indicates the single-contrast combination of two or more pixels.

These and other objects of the present invention will become apparent from the description below and accompanying drawings.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
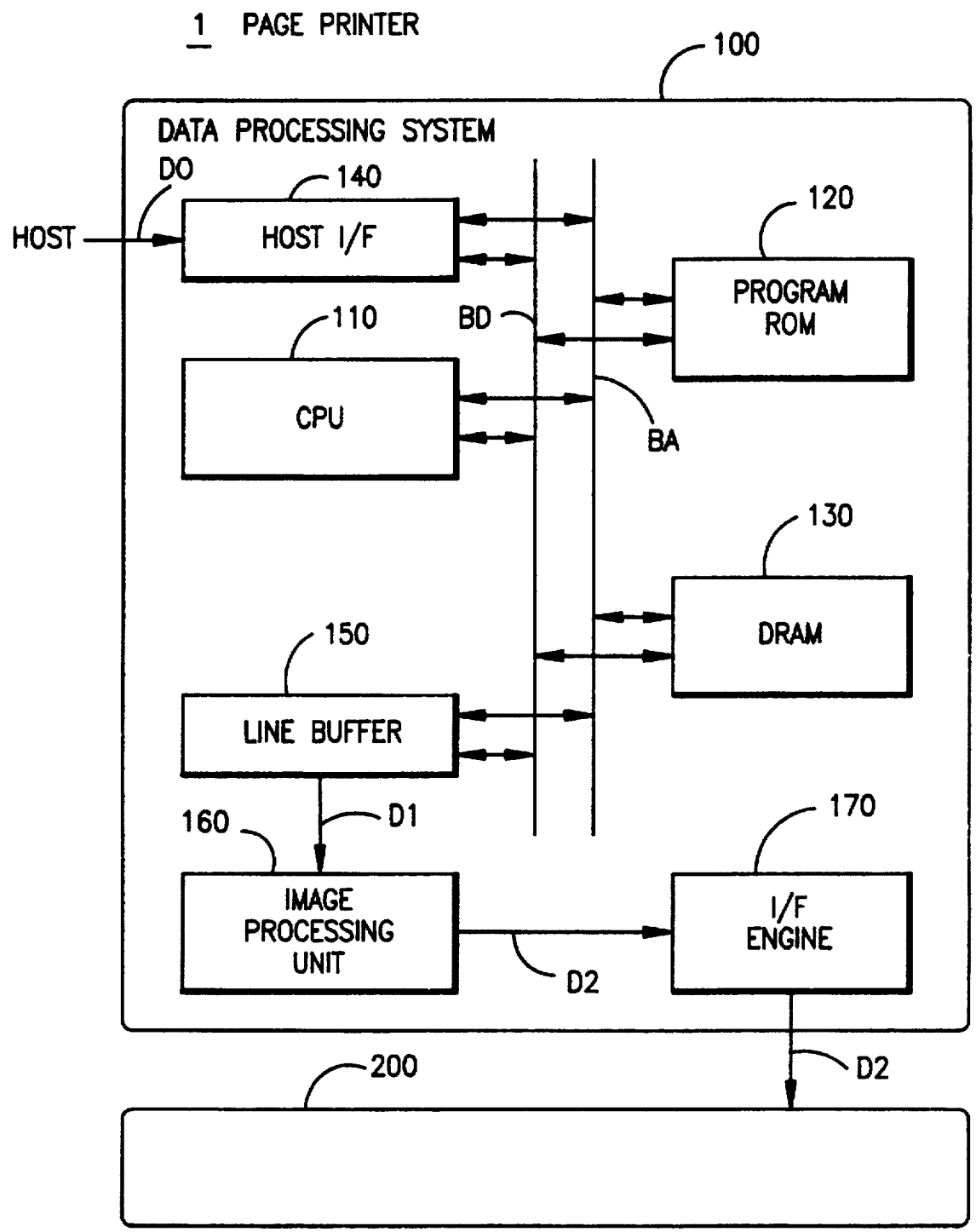
FIG. 1 is a block diagram showing the construction of a page printer in which the present invention is applied.

FIG. 1 is a block diagram showing the construction of a page printer 1 in which the present invention is applied.

The page printer 1 comprises (i) data processing system 100 that analyzes print data (image information and commands) DO input from an external host and outputs output image data D2, and (ii) engine (imaging system) 200 that prints an image corresponding to output image data D2 onto paper.

Data processing system 100 comprises CPU 110 that controls said system, ROM 120 in which programs are stored, DRAM 130 into which various types of data are temporarily stored, host interface 140 for communication with the host, line buffer 150 for data transmission, image processing unit 160 to increase image reproducibility, engine interface 170 for communication with engine 200, data bus BD, address bus BA, etc. CPU 110 acts as a print controller that manages the overall operation of page printer 1. DRAM 130 is used as, among other things, a receiving buffer and a bitmap memory (frame buffer).

CPU 110 sequentially reads out from the receiving buffer (for example, DRAM 130) and analyzes print data DO (it interprets printing instructions given in a page description language, for example) and performs virtual imaging (bitmap development), converting character codes into letter patterns and arranging a halftone image in the coordinate region designated by the host, in the bitmap area of DRAM 130.

When virtual imaging for one page has been completed, CPU 110 reads out image data D1 from DRAM 130 and sends it to image processing unit 160. Image processing unit 160 performs, among other things, gradation reproduction regarding image data D1, as described below, and then outputs post-processing single-contrast output image data D2 to engine interface 170. Output image data D2 is forwarded to engine 200 by means of engine interface 170.

Engine 200 has an imaging unit that performs electronic photographic processing and a paper conveyance system that conveys paper (the paper on which the image is to be recorded), and is constructed such that full color printing is possible. When output image data D2 is input from data processing system 100, latent image formation (exposure) begins, and paper is then sequentially conveyed from the transference position to the paper exit window via the fixing position, in correspondence with the progress of the imaging process (developing, transference, fixing). Where a full-color image is output, toner images for each developing color Y (yellow), M (magenta), C (cyan) and K (black) are formed one color at a time, and the four color toner images are applied to the paper one color image on top of another.

Although a latent image print engine is described above, other types of print engines, such as an ink jet or thermal printer, may also be used with the present invention.

Figure 2:
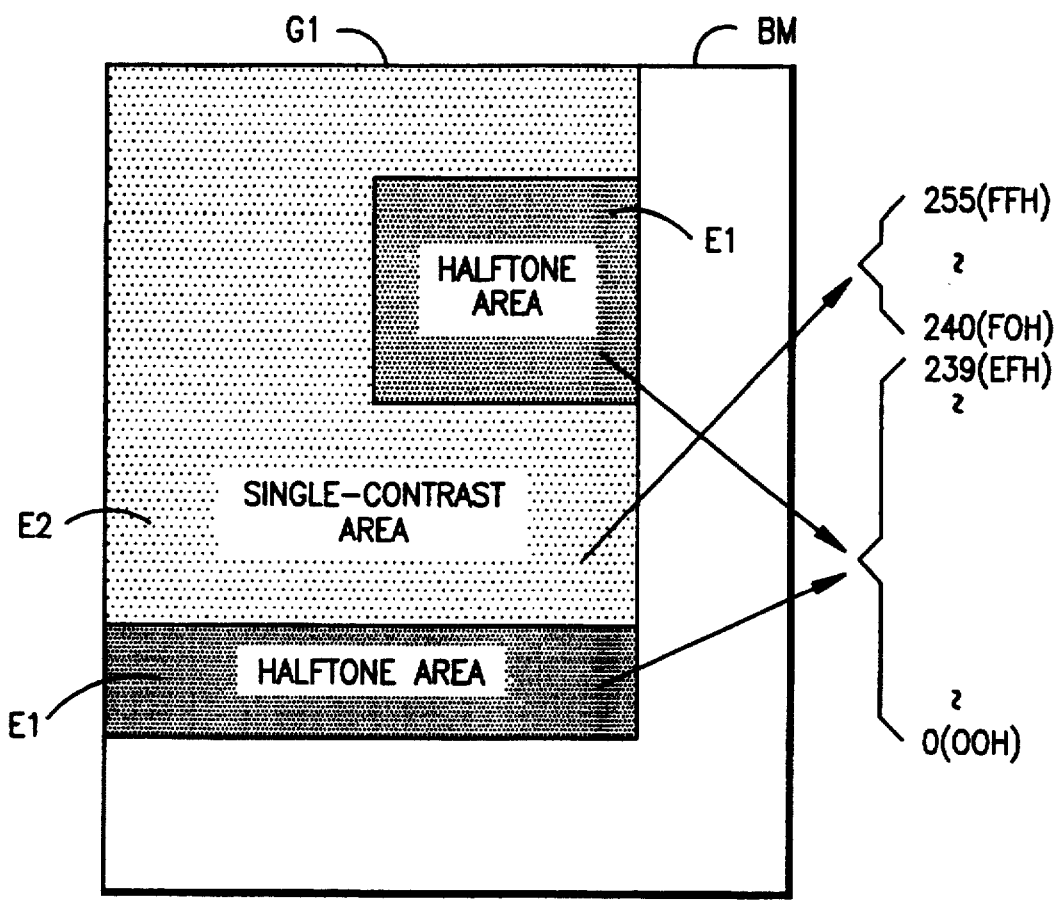
FIG. 2 is an illustration showing the construction of the bitmap memory data.

FIG. 2 is an illustration showing the construction of the data in bitmap memory BM.

In bitmap memory BM, image GI of a designated size is virtually imaged with a plurality of imaging units, each having eight bits. In other words, image GI to be printed is expressed as a collection of digital data for each 8-bit unit. The imaging unit here corresponds to a single pixel of a printed image having a resolution of 300 dpi.

In this virtual imaging of image GI, of the 0–255 (decimal expression) value range for the 8-bit data, the 240 data values of 0–239 (OOH-EFH in hexadecimal expression) are allocated to halftone area E1, and the remaining 16 data values of 240–255 (FOH-FFH in hexadecimal expression) are allocated to single-contrast area E2. By means of the data conversion described below, regarding halftone area E1, density data (240 gradation levels) for each imaging unit is stored at an appropriate address in bitmap memory EM, and regarding single-contrast area E2, data indicating single-contrast image patterns for a resolution of 600 dpi is stored in the bitmap memory BM. Area designation information is provided by the host in order to distinguish between halftone area E1 and single-contrast area E2.

Figure 3:
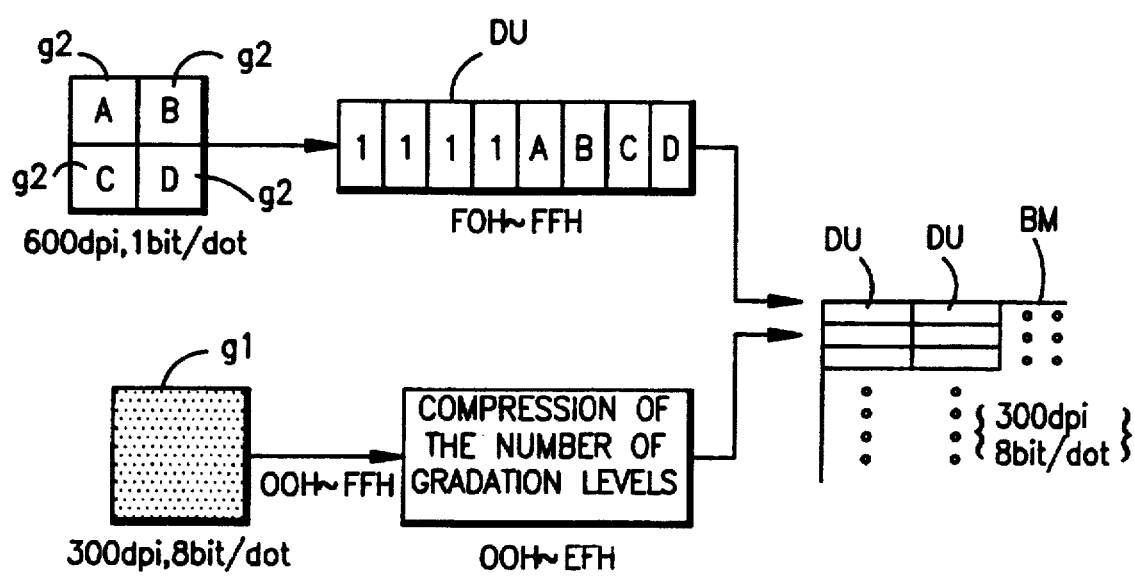
FIG. 3 is an illustration showing the details of the data conversion in virtual imaging.
Figure 4:
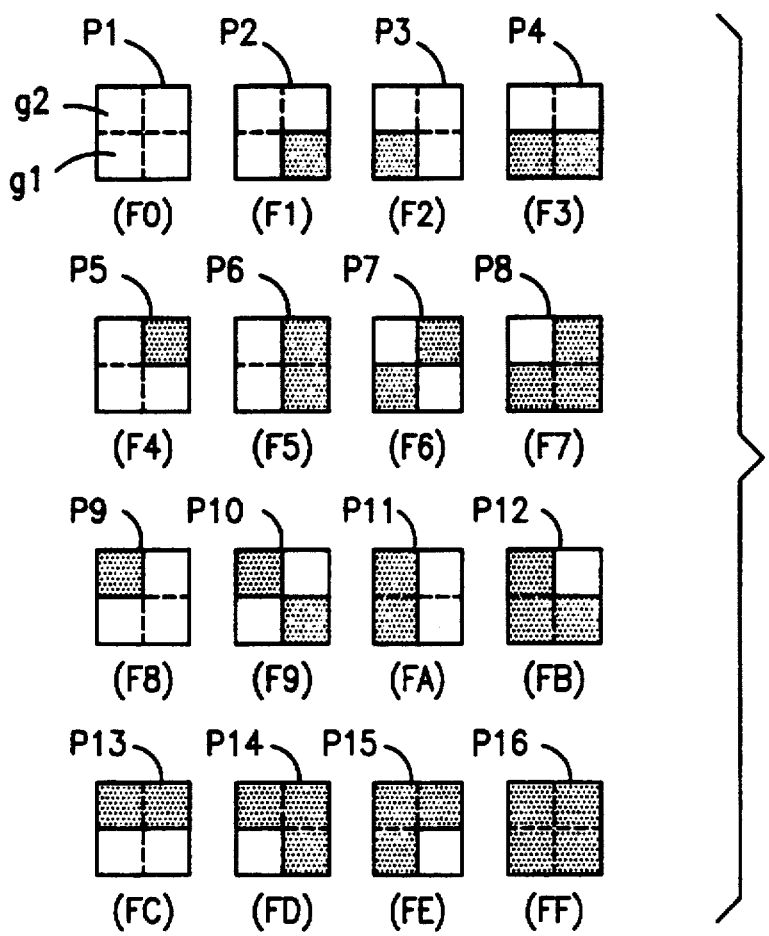
FIG. 4 shows examples of single-contrast image patterns.

FIG. 3 shows the details of the data conversion occurring in connection with virtual imaging, and FIG. 4 shows examples of single-contrast image patterns.

In single-contrast area E2, four single-contrast pixels g2 comprising two in a row and two in a column are deemed one block, and the combination of two tones in this block, or in other words, 16 image patterns P1 through P16 shown in FIG. 4, is expressed by the lower four bits of 8-bit imaging unit data DU. For example, as shown by the letters A, B, C and D in FIG. 3, one bit is allocated to single-contrast pixel g2. In this way, single-contrast area E2 for a 600 dpi resolution can be expressed with imaging unit data DU for a 300 dpi resolution. Since the value range for single-contrast area E2 is F0H through FFH, as described above, the upper four bits of imaging unit data DU are all '1'. The expressions in parentheses in FIG. 4 indicate the data values of imaging unit data DU (hexadecimal expression) corresponding to each of the image patterns PI through P16.

On the other hand, for halftone area E1, it is necessary to compress the density (the number of gradation levels) for pixel g1 having a 300 dpi resolution. This is because the number of data values that can be allocated to pixel g1 was reduced from 256 to 240 since part of the value range for imaging unit data DU was allocated to single-contrast area E2.

Although the number of gradation levels is reduced by the compression, since it is a reduction of only around 6.25%, there is little impact on image quality. If a variable area tone method is used that employs only 64 through 128 different gradation levels, such as in the dither method described below, there is no impact from compression.

Figure 5:
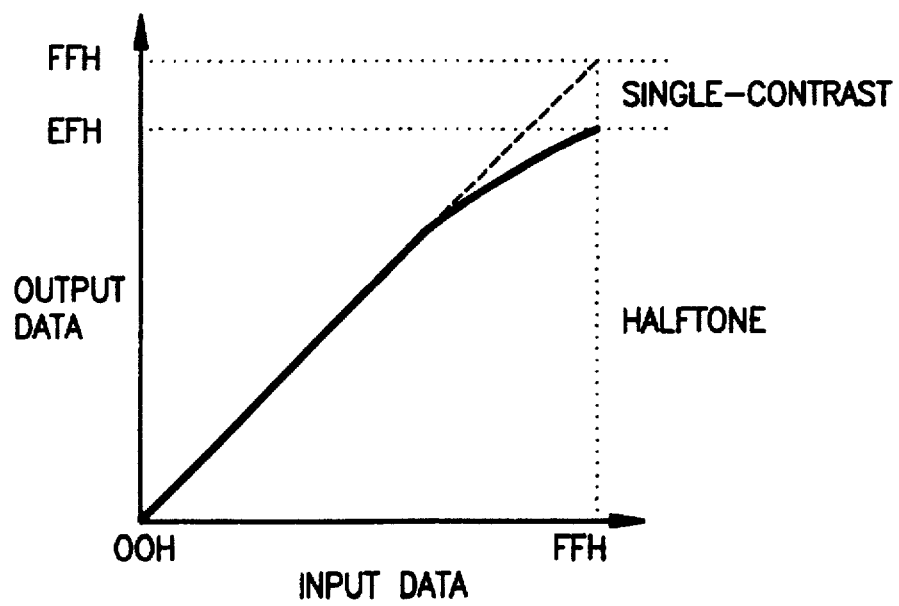
FIG. 5 shows one example of compression of the number of gradation levels.

FIG. 5 shows one example of compression of the number of gradation levels.

Where the number of gradation levels is to be compressed, two methods are available: one is to perform compression uniformly over the entire original density range, and the other is to perform compression while focusing on a part of the density range. However, since human visual sensitivity is higher at lower densities, a method in which the compression takes place while focusing on high density areas, as in the example shown in FIG. 5, is preferred.

Figure 6:
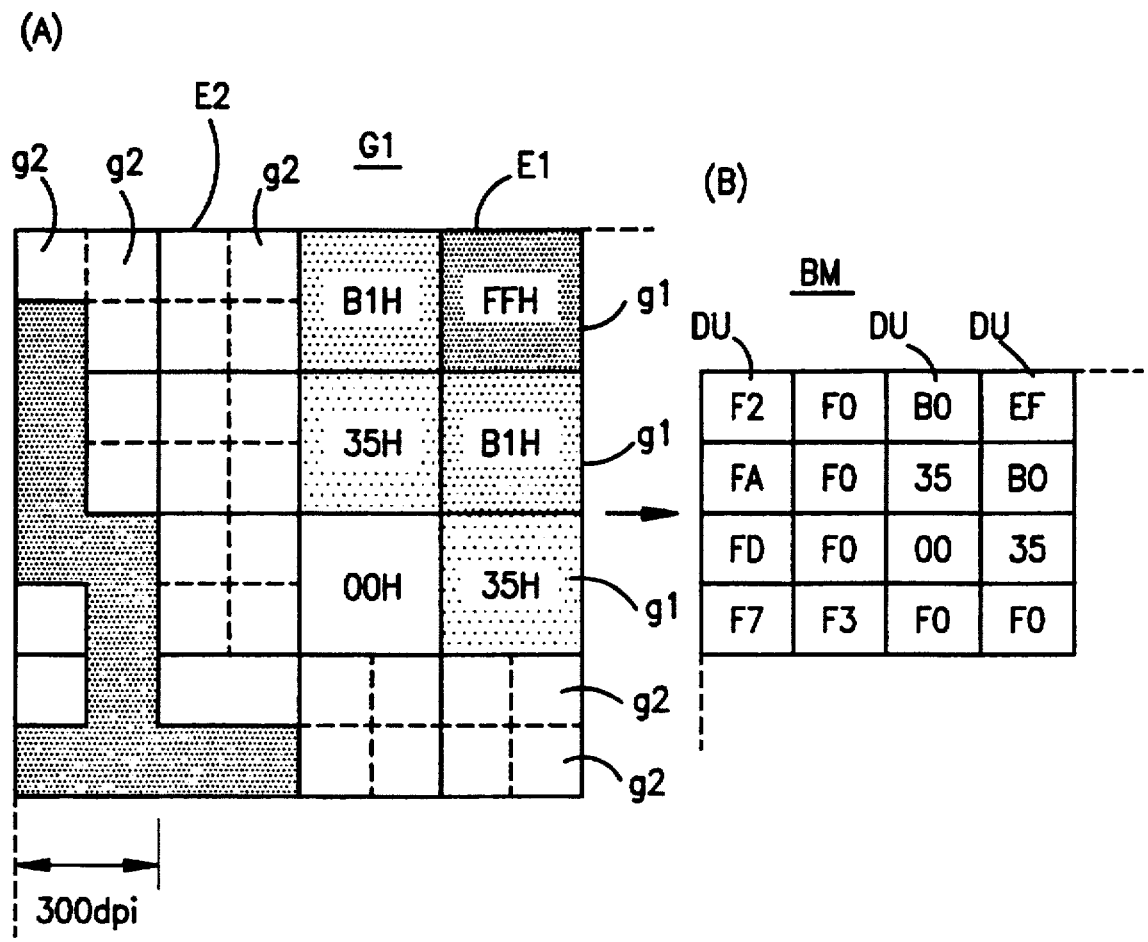
FIG. 6 shows a specific example of data conversion in virtual imaging.

FIG. 6 shows a specific example of data conversion in virtual imaging.

FIG. 6(A) shows a part of image G1. In FIG. 6(A), regarding halftone area E1, the density of pixel g1 is indicated using a hexadecimal number, while regarding single-contrast area E2, the density of pixel g2 is indicated using a white square or black square. FIG. 6(B) shows data values of imaging unit data DU stored in bitmap memory BM.

In the example shown in FIG. 6, the data values for low densities in halftone area E1 (00H, 35H) are stored in bitmap memory BM as is. In comparison, the data values for high densities (B1H, FFH) are replaced with slightly smaller values via said compression.

Imaging unit data DU thus generated is read out of bitmap memory BM item by item and forwarded to image processing unit 160.

Figure 7:
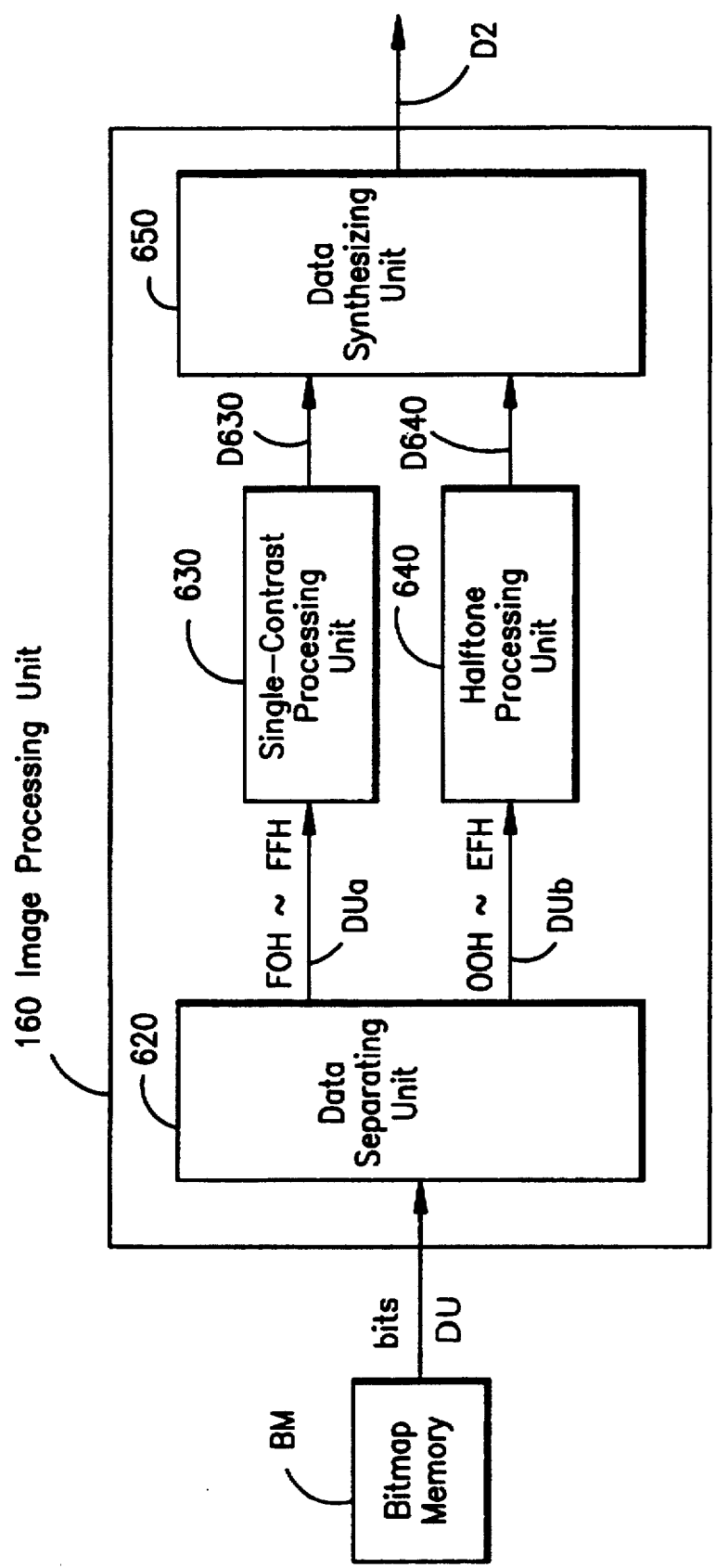
FIG. 7 is a block diagram of an image processing unit.
Figure 8:
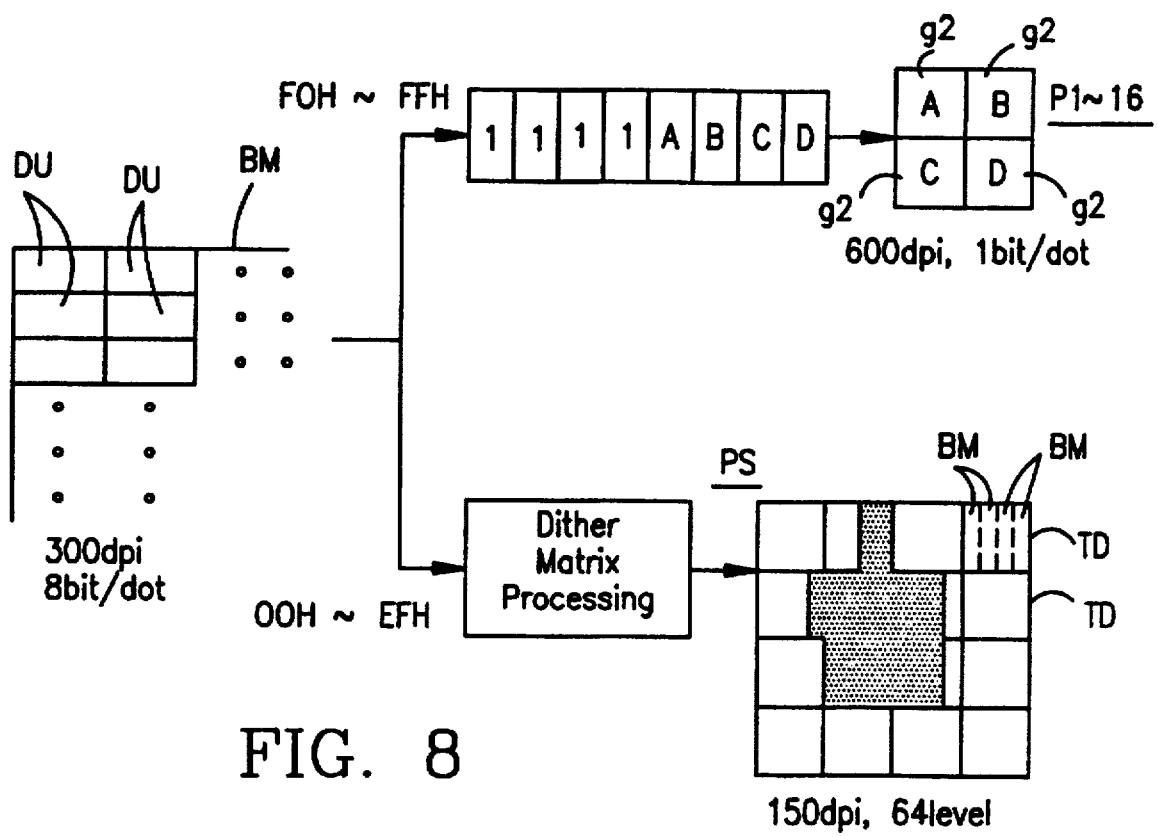
FIG. 8 is an illustration showing the details of the image restoration performed by the image processing unit.

FIG. 7 is a block diagram of image processing unit 160. FIG. 8 is an illustration showing the details of the image restoration performed by image processing unit 160.

Image processing unit 160 has data separating unit 620, single-contrast processing unit 630, halftone processing unit 640 and data synthesizing unit 650.

Data separating unit 620 directs imaging unit data DU input from bitmap memory BM to single-contrast processing unit 630 or to halftone processing unit 640, depending on the data value. Specifically, imaging unit data DU having a data value in the range of F0H through FFH is sent to single-contrast processing unit 630 as single-contrast area data DUa and imaging unit data DU having a data value in the range of 00H through EFH is sent to halftone processing unit 640 as halftone area data DUb.

Single-contrast processing unit 630 looks at the lower four bits of imaging unit data DU, as shown in FIG. 8, and depending on the combination of the four bits, it outputs image data D630 that indicates one of image patterns P1 through P16 each comprising four single-contrast pixels g2. Single-contrast processing unit 630 also performs smoothing that improves the quality of single-contrast images where necessary.

Halftone processing unit 640 is constructed such that it performs pseudo-gradation reproduction using a dot concentration type dither matrix. It converts halftone area data DUb, which has one of many tones, into single-contrast image data D640 and outputs the same.

Data synthesizing unit 650 outputs logical sum data of image data D630 and D640 that are output from single-contrast processing unit 630 and halftone processing unit 640, respectively, as output image data D2 for the purpose of exposure control regarding engine 200.

Figure 9:
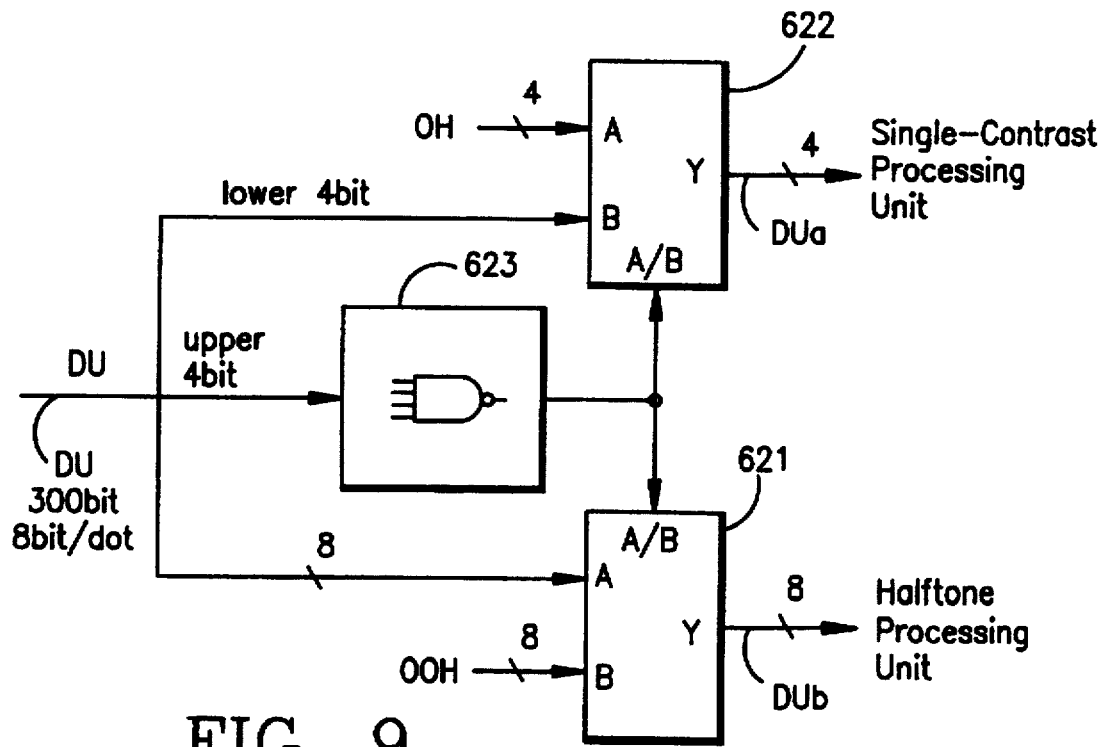
FIG. 9 is a circuit diagram of a data separating unit.

FIG. 9 is a circuit diagram of data separating unit 620.

8-bit imaging unit data DU is input to first data selector 621. The lower four bits of imaging unit data are input to second data selector 622, and the upper four bits are input to logical determination circuit 623.

Where the upper four bits of imaging unit data DU are all '1', the data values of imaging unit data DU fall within the range of F0H through FFH. In this case, the lower four bits of imaging unit data DU are sent to single-contrast processing unit 630 as is, as 4-bit single-contrast area data DUa, by data selector 622. When this happens, white data in which all bits are '0' is synchronously sent to halftone processing unit 640 as halftone area data DUb.

On the other hand, where any of the upper four bits of imaging unit data DU is '0', the data values of imaging unit data DU fall within the range of 00H through EFH. In this case, imaging unit data DU is sent to halftone processing unit 640 as is, as 8-bit halftone area data DUb, by data selector 621. When this happens, 4-bit white data is synchronously sent to single-contrast processing unit 630 as single-contrast area data DUa.

Figure 10:
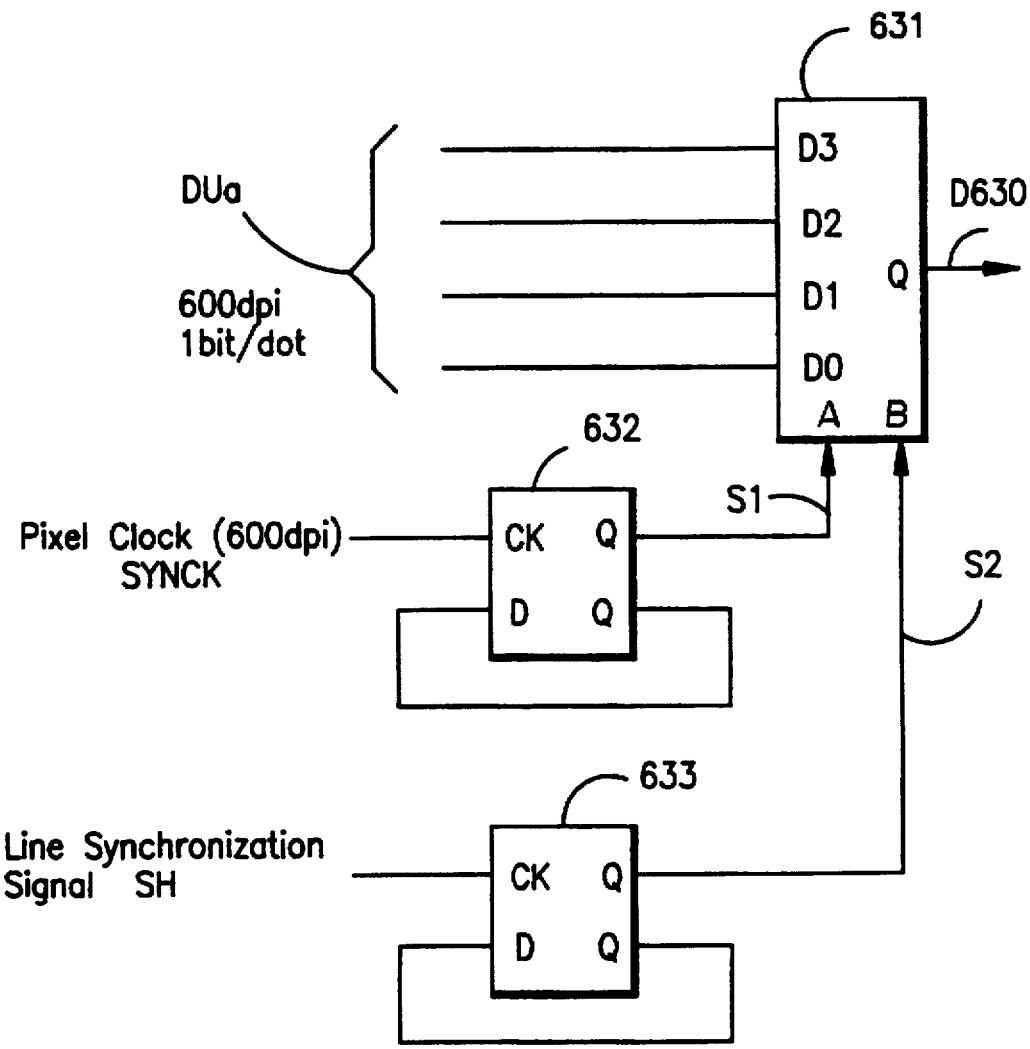
FIG. 10 is a circuit diagram of parts of a single-contrast processing unit.

FIG. 10 is a circuit diagram of parts of the single-contrast processing unit 630.

4-bit single-contrast area data DUa is input to selector 631. Selector 631 selects and outputs designated single bits of single-contrast area data DUa in accordance with select signals S1 and S2. Select signals S1 and S2 are generated by D flip-flop circuits 632 and 633 based on pixel clock SYNCK for 600 dpi and line synchronization signal SH for 600 dpi.

Figure 11:
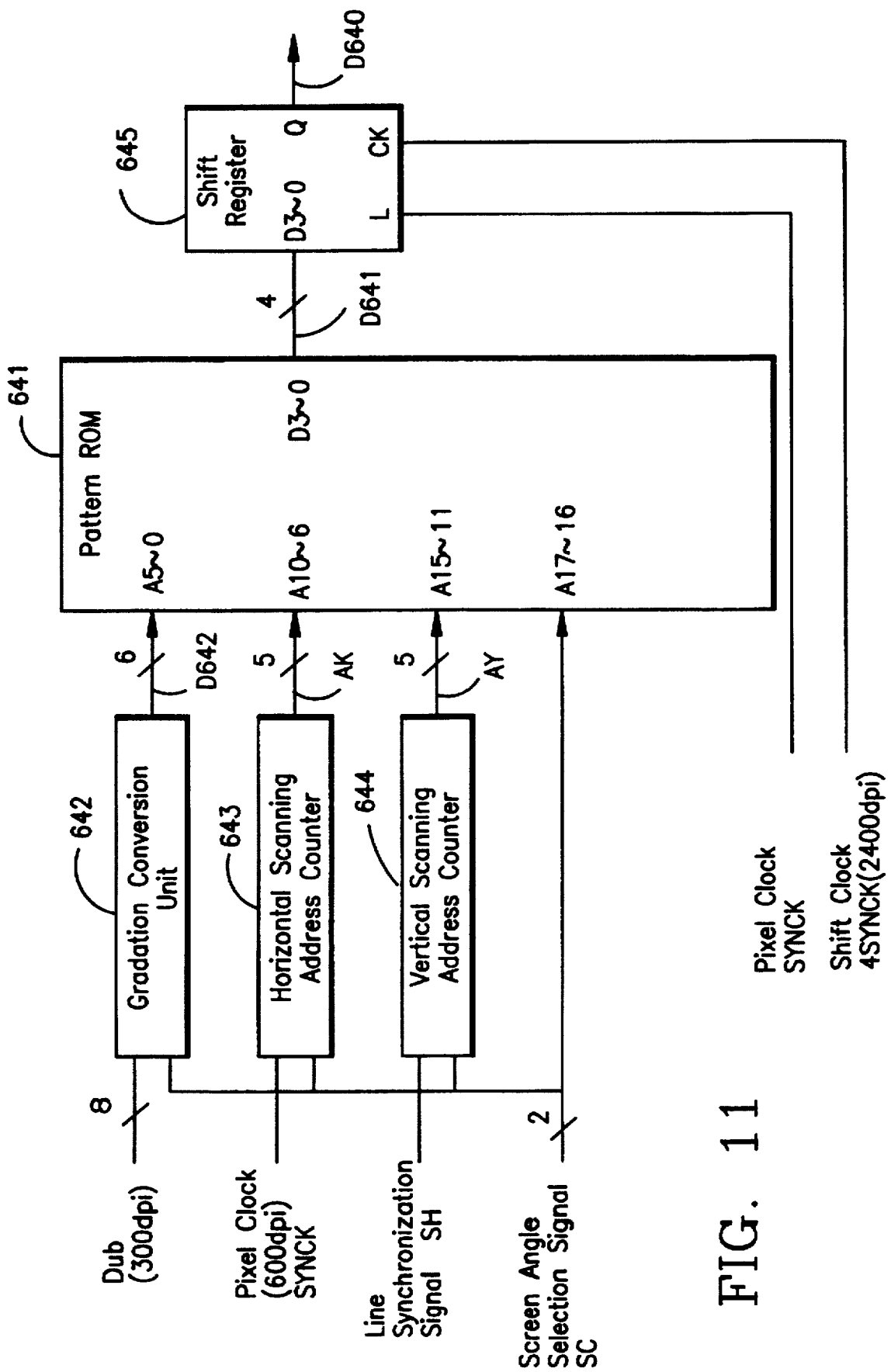
FIG. 11 is a circuit diagram of a halftone processing unit.
Figure 12:
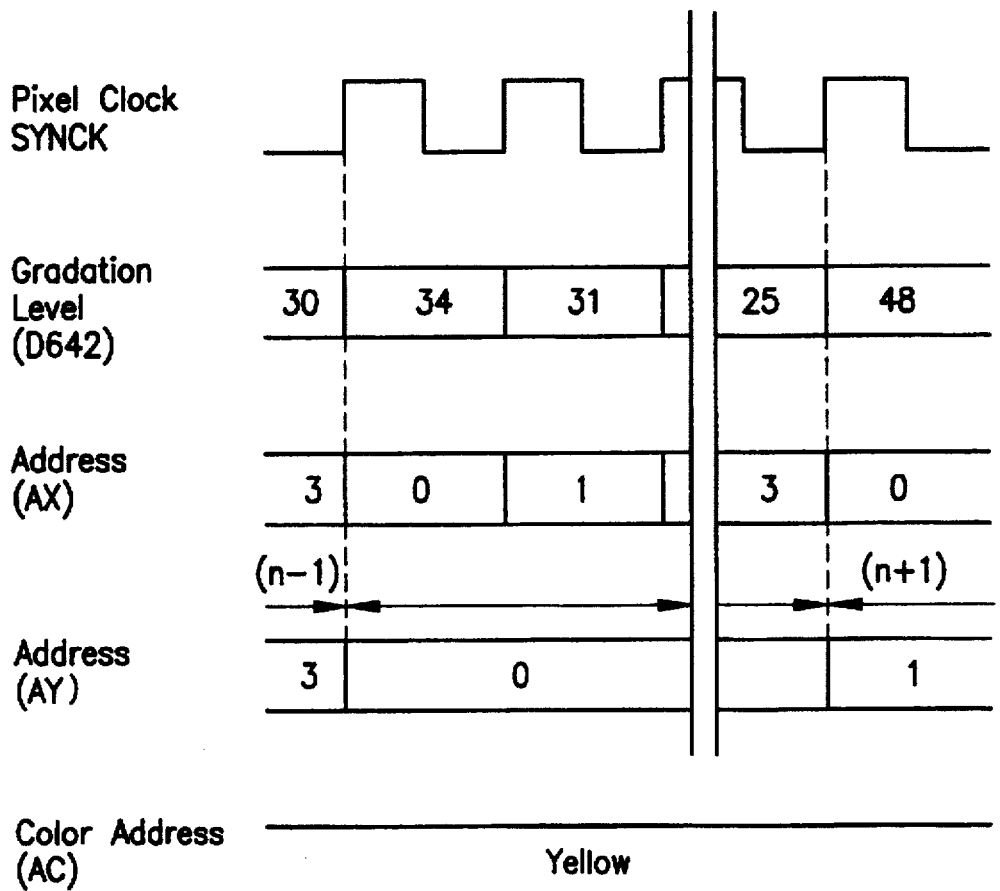
FIG. 12 is a timing chart for address designation.
Figure 13:
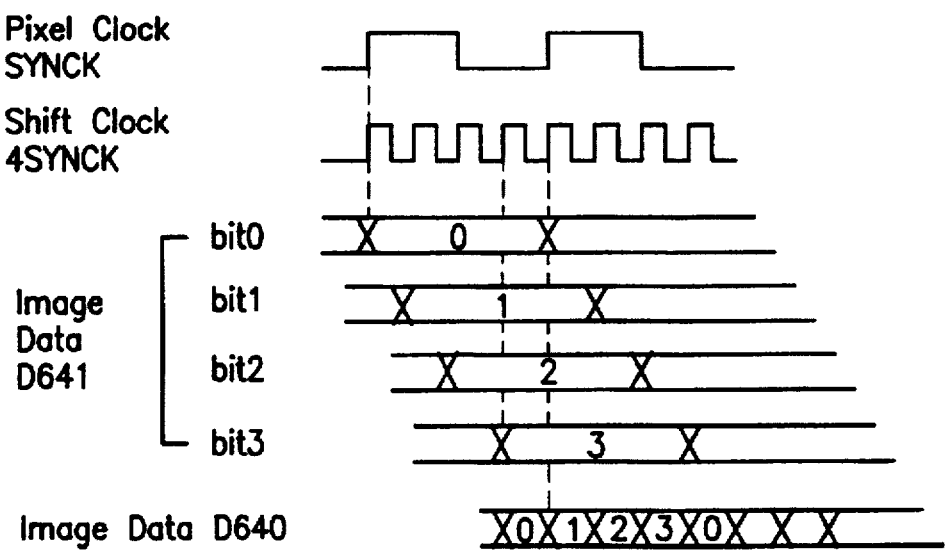
FIG. 13 is a shift register operation timing chart.

FIG. 11 is a circuit diagram of halftone processing unit 640. FIG. 12 is an address designation timing chart. FIG. 13 is an operation timing chart for shift register 645.

In FIG. 11, halftone processing unit 640 comprises pattern ROM 641, gradation conversion unit 642, horizontal scanning address counter 643, vertical scanning address counter 644 and shift register 645.

Gradation conversion unit 642 compresses 8-bit halftone area data Dub (240 gradation levels) input in a previous step into 6-bit gradation data D642 (64 gradation levels). This data compression is performed in order to reduce the required amount of memory in pattern ROM 641.

Pattern ROM 641 stores numerous exposure patterns (dither patterns) comprising v×w matrices corresponding to each gradation level and developing color. As shown in FIG. 8, v×w divisions TD that comprise a single exposure pattern PS are each composed of k elements EM. k is a number of pixel divisions (600 dpi) and the explanation below assumes k to be 4 (k=4).

A group of exposure patterns corresponding to one gradation level is designated based on gradation data D642, and a group of exposure patterns appropriate to the developing color is designated based on screen angle selection signal SC. As a result, a single exposure pattern PS is designated. Simultaneously, one of the v×w divisions TD comprising designated exposure pattern PS is designated based on horizontal scanning address AX and vertical scanning address AY. 4-bit image data D641 within designated single division TD indicating exposure pattern PS is read out in synchronization with pixel clock SYNCK.

Horizontal scanning address AX is a count value for pixel clock SYNCK counted by horizontal scanning address counter 643. Horizontal scanning address counter 643 repeats counting within a prescribed range of values in accordance with the number of divisions TD arranged in a horizontal direction (line direction, parallel direction or horizontal scanning direction) of exposure pattern PS. For example, if the size of exposure pattern PS is 4 (v)×4 (w), counting is repeated in the range of 0 through 3, as shown in FIG. 12.

Vertical scanning address AY is a count value for line synchronization signals SH counted by vertical scanning address counter 644. Vertical scanning address counter 644 repeats counting within a prescribed range of values in accordance with the number of divisions TD arranged in a vertical direction (column direction, vertical direction or vertical scanning direction) of exposure pattern PS. For example, if the size of exposure pattern PS is 4 (v)×4 (w), counting is repeated in the range of 0 through 3, as shown in FIG. 12.

The maximum count values in horizontal scanning address counter 643 and vertical scanning address counter 644 are changed in accordance with screen angle selection signal SC. In this way, one or both of the matrix size and the screen angle of exposure pattern PS are changed in accordance with the developing color, whereby the quality of color reproduction is improved.

4-bit image data D641 read out from pattern ROM 641 is input to shift register 645 synchronously with pixel clock SYNCK.

Shift register 645 latches image data D641 synchronously with pixel clock SYNCK, and performs data shifting on image data D641 synchronously with shift clock 4SYNCK. Then, as shown in FIG. 13, image data D641 is serially output one bit at a time as image data D640.

Shift clock 4SYNCK is a pulse signal for a 2400 dpi resolution and has four times the frequency of pixel clock SYNCK. In other words, in halftone processing unit 640, the data transmission cycle on the output side is one-quarter of said cycle on the input side.

The embodiment described above used an example in which the number of bits of imaging unit data DU was eight, but in principle, if the number of bits is three or more, two or more data values may be allocated to single-contrast area E2 and three or more data values may be allocated to halftone area E1. However, because gradation levels of 64 to 128 are required in actual practice, six or more bits are desirable. In addition, within the range of values of imaging unit data DU, values outside the range of F0H through FFH may be freely selected as data values to be allocated to single-contrast area E2. Here, it is not necessary to allocate continuous values.

In the embodiment described above, the resolution of single-contrast area E2 may be three or more times the resolution of halftone area E1. Where a resolution three times the resolution of halftone area E1 is used, a pixel pattern comprising 9 (3×3) single-contrast pixels g2 is made to correspond to imaging unit data DU. In addition, the resolutions in the horizontal scanning direction and the vertical scanning direction may be different. Moreover, such things as the circuit constructions for each part of image processing unit 160, the method of gradation reproduction and the details of the processing may be changed. For example, during gradation reproduction, output image data may be generated via the normal dither method without separating divisions TD of exposure pattern PS.

The present invention may also be applied to display images by means of a display device.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method of image data processing for an image including halftone areas and single-contrast areas, comprising the steps of:

expressing each image unit of said image by a respective unit of data, each data unit selected from a fixed range of data values, wherein each of the image units relating to a halftone area is expressed by a data value within a first portion of the fixed range of data values and each of the image units relating to a single-contrast area is expressed by a data value within a second portion of the fixed range of data values;

separating said image units into halftone image units and single-contrast image units by determining whether the data value for a particular image unit is from the first portion or the second portion of the fixed range;

processing said halftone image units with a halftone processing unit; and processing said single-contrast image units with a single-contrast processing unit.

2. The method of claim 1, wherein a number of density levels used to express each image unit relating to a half-tone area is compressed to correspond to the first portion of the fixed range of data values.

3. The method of claim 2, wherein only the density levels in a high density range are compressed.

4. The method of claim 1, wherein each data unit has at least three bits.

5. The method of claim 1, wherein each data value in the second portion of the fixed range of data values represents an image pattern of at least two single-contrast pixels.

6. The method of claim 1, wherein each data value in the first portion of the fixed range of data values represents a density level of a halftone pixel.

7. The method of claim 5, wherein each data value in the first portion of the fixed range of data values represents a density level of a halftone pixel.

8. The method of claim 7, wherein each halftone pixel is the same size as each image pattern.

9. The method of claim 1, wherein each data unit has eight bits, the second portion of the fixed range includes sixteen data values, and the first portion of the fixed range includes 240 data values.

10. The method of claim 5, wherein the image pattern includes four single-contrast pixels.

11. A method of storing image data including data representing halftone images and data representing higher resolution single-contrast images into an image memory having a memory capacity suited to a fixed number of pixels and a fixed number of data values, the method comprising the steps of:
 using only a first portion of the fixed number of data values to represent pixel patterns made of at least two single-contrast pixels; and
 using only a remainder of the fixed number of data values to represent halftone image densities.

12. An image processing apparatus for making visible images expressed by image units that are represented by image data units, each of the image data units having three or more bits, the image processing apparatus comprising:
 a single-contrast processing unit that outputs a set of image data units, wherein each image data unit of the set corresponds to at least two single-contrast pixels; and the image data units of the set include only values from a first part of a range of values;
 a halftone processing unit that outputs image data units that include only values from a second part of the range of values; and
 a data synthesizing unit that synthesizes the image data units output from the single-contrast processing unit and the halftone processing unit.

13. The apparatus of claim 12, wherein a number of density levels used to express each image unit relating to a halftone area is compressed to correspond to the second part of the range of the values.

14. The apparatus of claim 13, wherein only the density levels in a high density range are compressed.

15. The apparatus of claim 12, wherein each value in the first part of the range of values represents an image pattern of at least two single-contrast pixels.

16. The apparatus of claim 12, wherein each value in the second part of the range of values represents a density level of a halftone pixel.

17. The apparatus of claim 15, wherein each value in the second part of the range of values represents a density level of a halftone pixel.

18. The apparatus of claim 17, wherein each halftone pixel is the same size as each image pattern.

19. The apparatus of claim 12, wherein each image data unit has eight bits, the first part of the range includes sixteen values, and the second part of the range includes 240 values.

20. The apparatus of claim 15, wherein the image pattern includes four single-contrast pixels.

21. An image data processing apparatus, comprising:
 an analyzing unit that analyzes image data received from an outside source;
 a memory that stores the image data analyzed by the analyzing unit;
 a determination unit that determines whether the image data read out of the memory is a first type image data or a second type image data;
 a first processing unit that processes the image data determined to be the first type image data;
 a second processing unit that processes the image data determined to be the second type image data; and
 a synthesizing unit that synthesizes the image data processed by the first processing unit and by the second processing unit.

22. The apparatus of claim 21, wherein each image data has at least three bits.

23. The apparatus of claim 21, wherein each value of the first type image data represents an image pattern of at least two single-contrast pixels.

24. The apparatus of claim 21, wherein each value of the second type image data represents a density level of a halftone pixel.

25. The apparatus of claim 23, wherein each value of the second type image data represents a density level of a halftone pixel.

26. The apparatus of claim 25, wherein each halftone pixel is the same size as each image pattern.

27. The apparatus of claim 21, wherein each image data has eight bits, the first type image data includes sixteen values, and the second type image data includes 240 values.

28. The apparatus of claim 23, wherein the image pattern includes four single-contrast pixels.

29. The method of claim 1, wherein the first portion of the fixed range does not overlap the second portion of the fixed range.

30. The apparatus of claim 12, wherein the first part of the range of values does not overlap with the second part of the range of values.

31. A method of image data processing, comprising the steps of:
 receiving multi-level image data and single contrast image data;
 converting the multi-level image data into first data units comprising data values selected from only a first portion of a fixed range of data values;
 converting the single contrast image data into second data units comprising data values selected from only a second portion of the fixed range of data values, wherein the first portion is not overlapping with the second portion; and
 wherein the first data units and the second data units each include a same number of bits.

32. The method of claim 31, wherein the multi-level image data represents a predetermined number of tone levels and the step of converting the multi-level image data includes converting the multi-level image data into first data units that represent less than the predetermined number of tone levels.

33. The method of claim 31, wherein each of the single contrast image data represents a pattern of pixels.

34. The method of claim 32, wherein each of the single contrast image data represents a pattern of pixels and the same number of bits is eight bits.

35. A method of image data processing, comprising the steps of:
 receiving image data having a fixed range of data values;
 analyzing the received image data and determining if a value of the image data is within a first portion of the fixed range or if the value of the image data is within a second portion of the fixed range;
 processing the received image data according to a first processing method if the value of the image data is within the first portion and processing the received image data if the value of the image data is within the second portion.

36. The method of claim 35, wherein the first and second portions are not overlapping.

37. The method of claim 35, wherein the first processing method is a multi-level image processing method and the second processing method is a single contrast image processing method.

38. The method of claim 35, wherein all of the received image data includes a same number of bits.

39. The method of claim 38, wherein the first and second portions are not overlapping.

40. The method of claim 39, wherein the first processing method is a multi-level image processing method and the second processing method is a single contrast image processing method.

41. The method of claim 40, wherein the image data having a value within the first range is compressed multi-level image data and the image data having a value within the second range is single contrast data representing a pattern of a plurality of pixels.

* * * * *